United States Patent
Gayer et al.

(10) Patent No.: US 7,367,583 B2
(45) Date of Patent: May 6, 2008

(54) INSTRUMENT PANEL WITH A PASSENGER AIRBAG

(75) Inventors: Bernd Gayer, Weissach (DE); Martin Frank, Muehlacker (DE); Thomas Bruening, Muehlacker (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 394 days.

(21) Appl. No.: 11/014,847

(22) Filed: Dec. 20, 2004

(65) Prior Publication Data

US 2005/0167955 A1    Aug. 4, 2005

(30) Foreign Application Priority Data

Dec. 19, 2003    (DE) .................... 103 59 751

(51) Int. Cl.
*B60R 21/20* (2006.01)
(52) U.S. Cl. ................... 280/732; 280/728.3
(58) Field of Classification Search ........... 280/728.3, 280/732
See application file for complete search history.

(56) References Cited

U.S. PATENT DOCUMENTS

| | | | | |
|---|---|---|---|---|
| 4,893,833 A | * | 1/1990 | DiSalvo et al. ........... 280/732 |
| 4,973,081 A | * | 11/1990 | Rafferty .................... 280/732 |
| 5,035,444 A | * | 7/1991 | Carter ........................ 280/732 |
| 5,082,310 A | * | 1/1992 | Bauer ........................ 280/732 |
| 5,096,221 A | * | 3/1992 | Combs et al. ............. 280/732 |
| 5,161,819 A | * | 11/1992 | Rhodes, Jr. ............. 280/728.3 |
| 5,288,103 A | * | 2/1994 | Parker et al. ............ 280/728.3 |
| 5,292,151 A | * | 3/1994 | Parker .................... 280/728.3 |
| 5,320,381 A | * | 6/1994 | Barnes et al. ........... 280/728.3 |
| 5,350,191 A | | 9/1994 | Kokeguchi et al. |
| 5,549,324 A | | 8/1996 | Labrie et al. |
| 5,816,609 A | | 10/1998 | Gray et al. |
| 6,357,787 B2 | | 3/2002 | Lorenz et al. |
| 2002/0027337 A1 | | 3/2002 | Shin |

FOREIGN PATENT DOCUMENTS

| | | |
|---|---|---|
| DE | 43 08 884 | 9/1993 |
| DE | 42 33 752 | 4/1994 |
| DE | 42 33 752 A1 | 4/1994 |
| DE | 299 22 988 U1 | 6/2000 |
| JP | 7-61310 A | 3/1995 |

OTHER PUBLICATIONS

European Search Report Dated Dec. 1, 2005 w/ English Translation of relevant portion (Four(4) pages).

* cited by examiner

*Primary Examiner*—Ruth Ilan
(74) *Attorney, Agent, or Firm*—Crowell & Moring LLP

(57) ABSTRACT

An instrument panel has a passenger airbag system such that, in the deployment of the airbag, an airbag cover on the top side of the instrument panel adjacent to the windshield is upwardly displaceable in the direction of the windshield about a transverse pivot axis. Thereby, a passage for the actual airbag of the passenger airbag module is cleared. In order to prevent damage to the windshield due to the airbag cover being pivoted upward when the airbag is deployed, a transverse intended breaking line is provided on the airbag cover at a distance from the pivot axis so that the airbag cover is bent upward about this intended breaking line when it comes to rest against the windshield.

7 Claims, 4 Drawing Sheets

US 7,367,583 B2

INSTRUMENT PANEL WITH A PASSENGER AIRBAG

BACKGROUND OF THE INVENTION

This application claims the priority of German application 103 59 751.4, filed Dec. 19, 2003, the disclosure of which is expressly incorporated by reference herein.

The present invention relates to an instrument panel having a passenger airbag, whereby in the event of deployment of an airbag, an airbag cover on the top side of the instrument panel adjacent to the windshield is upwardly displaceable in the direction of the windshield about a pivot axis running transversely, thereby clearing a passage for the actual airbag of the passenger airbag module.

In particular when the airbag cover is provided on the top of the instrument panel, i.e., adjacent to the windshield and the airbag is designed in one piece, there is the risk, that in deployment of the airbag, the free end of the airbag cover might damage the windshield when the airbag cover is pivoted upward. Replacing a damaged windshield is time-consuming and relatively expensive.

SUMMARY OF THE INVENTION

An object of the present invention is to provide an airbag cover such that the damage to the windshield in deployment of an airbag is reliably prevented.

This object has been achieved by providing an intended breaking line running laterally is provided on the airbag cover at a distance from the pivot axis, so that the airbag cover is bent upward about this pivot axis when it comes to rest against the windshield.

Among the main advantages achieved through the present invention is that, when the airbag is deployed, as soon as its free end comes in contact with the windshield, the airbag cover folds upward in a defined manner due to the arrangement of an intended breaking line running transversely on the airbag cover. This folding prevents damage to the windshield which therefore need not be replaced. The intended breaking line is formed by a crease directed outward and/or upward in an interior sheet metal part and a corresponding weakened area in the carrier part in front of it.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

An instrument panel designated generally by numeral 1 for a passenger vehicle is arranged beneath a windshield 2 in a passenger compartment and extends over the entire width of the passenger compartment. An opening 3 can be seen on the driver's side, accommodating the instruments (not shown in detail) when the instrument panel 1 is completely installed.

Figure 1:
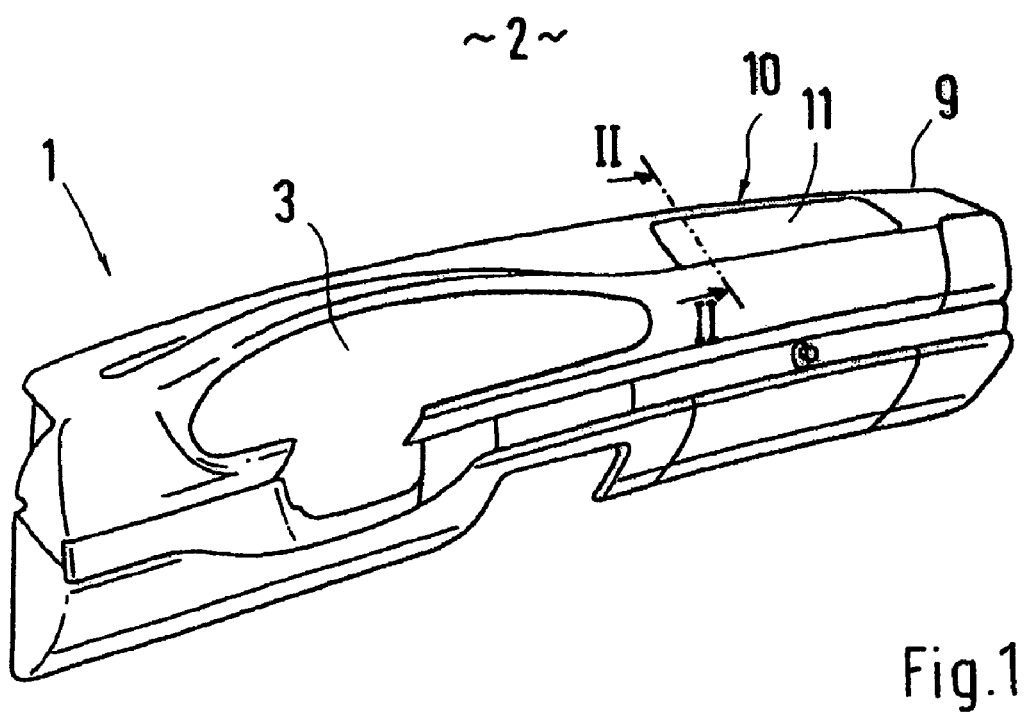
FIG. 1 is a perspective view obliquely from above of an instrument panel having a passenger airbag system.
Figure 2:
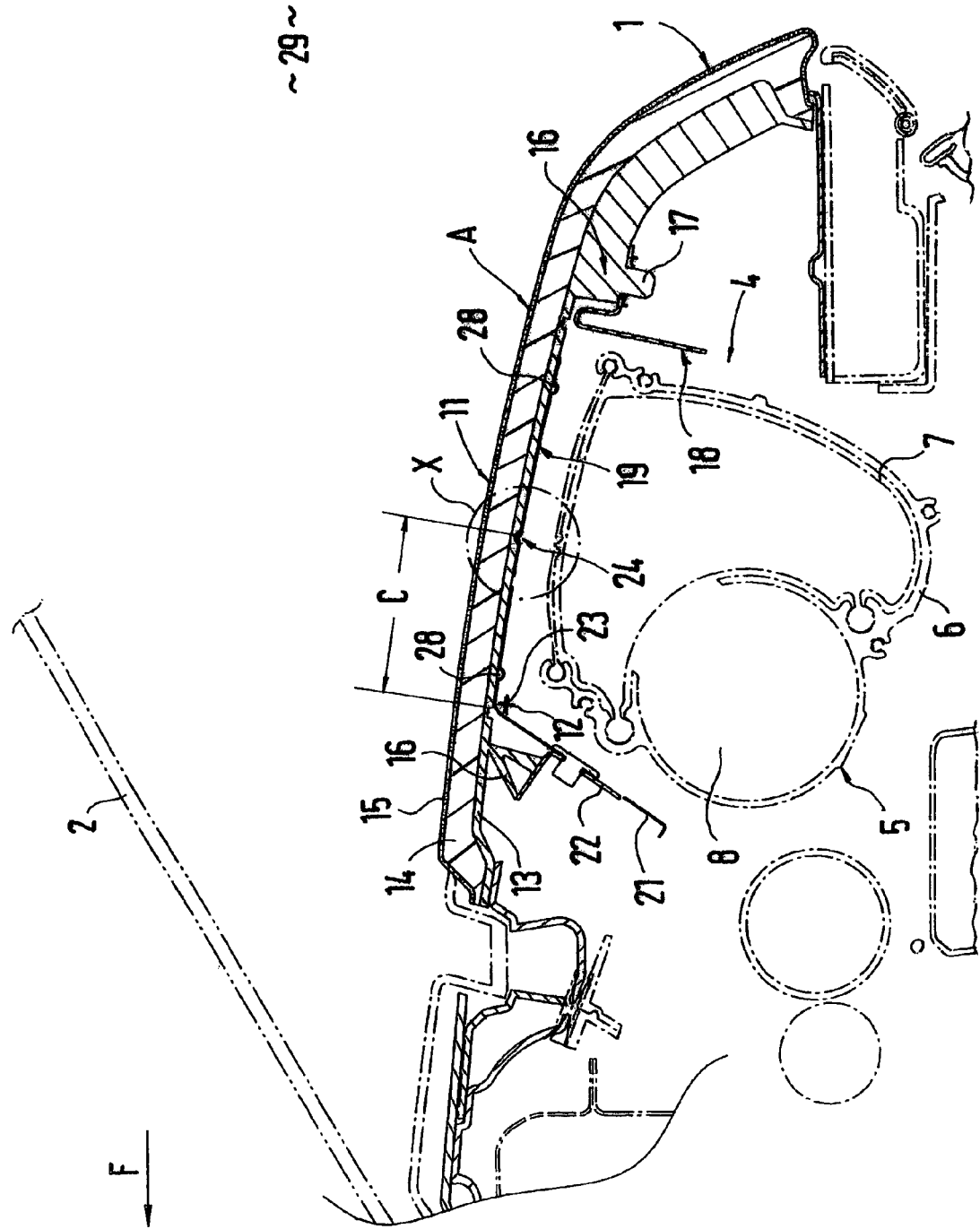
FIG. 2 is an enlarged sectional view along line II-II of FIG. 1 in the installed position of the airbag cover.
Figure 3:
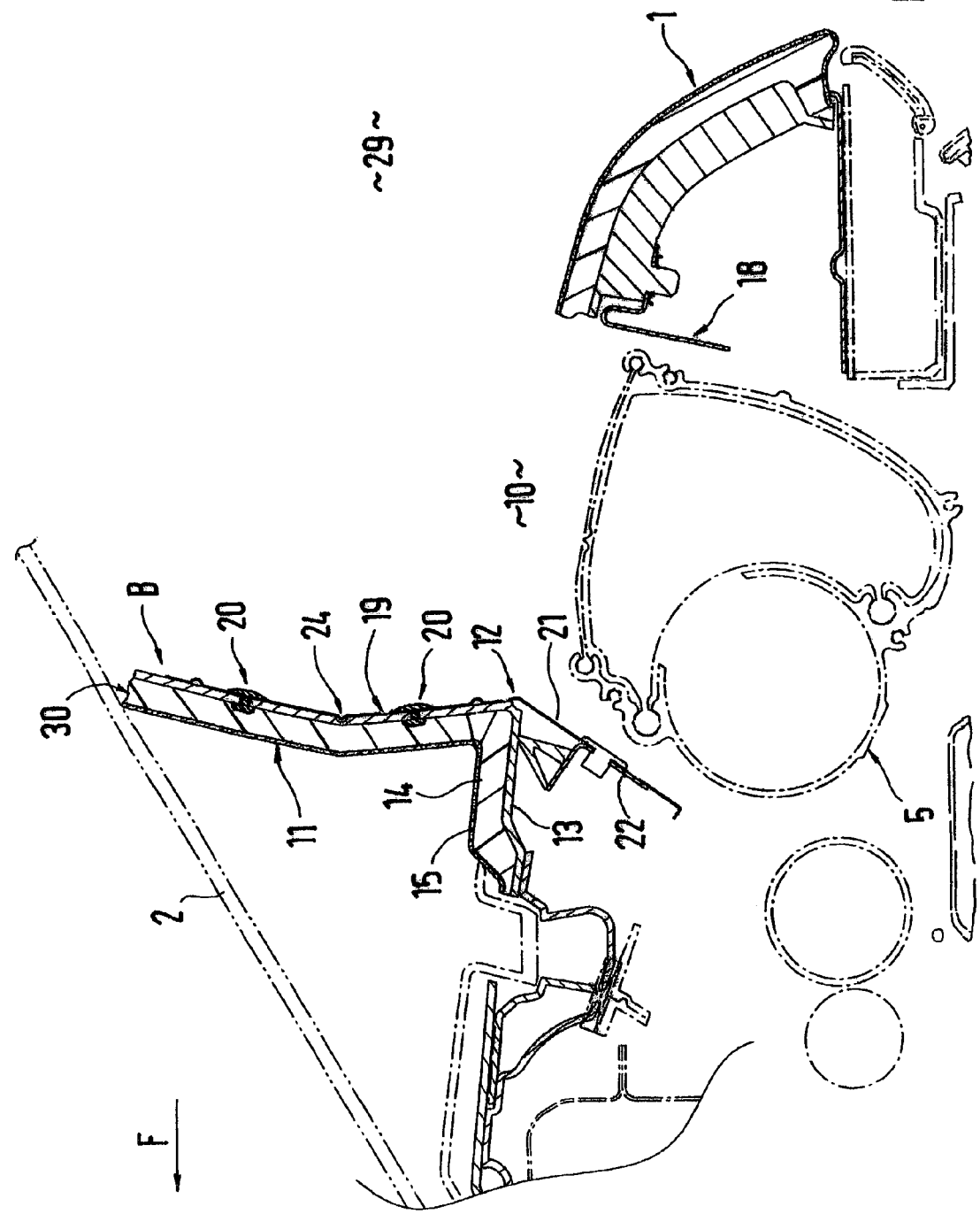
FIG. 3 is a sectional view similar to FIG. 2 but with the airbag cover after successful deployment of the airbag.

On the passenger side, the instrument panel 1 has a passenger airbag 4 to protect a passenger in a collision or accident involving the passenger vehicle. This passenger airbag 4 includes, as seen in FIGS. 2 and 3, a prefabricated airbag module 5 mounted on a transverse supporting tube on the instrument panel 1. The airbag module 5 consists essentially of a casing 6, the actual airbag 7, which is folded up in the casing 6, and a gas generator 8 for inflating the actual airbag 7. On the top side 9 of the instrument panel 1 adjacent to the windshield 2, an approximately rectangular opening 10 is provided, as seen in FIG. 1, covered by an airbag cover 11 which can be folded back.

In deployment of an airbag, the airbag cover 11 is pivoted upward in the direction of the windshield 2 about a pivot axis 12 which runs approximately horizontally at the front—as seen in the direction of travel F—and moves with its free end 30 toward the windshield 2.

In its installed position A in FIG. 2, the airbag cover 11 is curved slightly outward (without a break) as seen in the longitudinal direction of the vehicle and in the transverse direction of the vehicle, and is constructed in one piece. The airbag cover 11 may be formed by a separate cover which is connected by a hinge or the like to the adjacent instrument panel 1 (not shown in detail).

In the illustrated embodiment, the airbag cover 11 is an integral part of the instrument panel 1, i.e., as seen from the passenger compartment, there is no visible joint between the instrument panel 1 and the airbag cover 11. Both the airbag cover 11 and the instrument panel 1 have a similar multilayer design. The components 1, 11 are composed of a carrier part 13 which is on the inside and has dimensional stability, a plastic foam layer 14 above that part 13 and a decorative layer 15 on the side facing the passenger compartment. The plastic foam layer 14 is currently preferably formed by a polyurethane foam layer. Although a slush skin is provided as the decorative layer 14, the latter may also be formed by a film, synthetic or natural leather or the like.

The opening 10 on the instrument panel 1 is created by a peripheral intended breaking line being formed from the rear side of the instrument panel 1 by milling, laser cutting or the like, creating a peripheral intended breaking line which more or less forms a breaking line for the airbag cover 11 when the actual airbag 7 is unfolded. The airbag cover 11 is thus connected to the adjacent instrument panel 1 only by multiple local webs on the periphery. The weakened part is in the area of the carrier part 13 and in a partial area of the height extent of the plastic foam layer 14. Furthermore, the decorative layer 15 may be weakened through suitable measures on the side facing away from the passenger compartment 29.

Outside of the rectangular opening 10, a peripheral profiled reinforcing frame 16 with locally protruding pins 17 is provided on the area of the carrier part 13 facing the instrument panel. An approximately rectangular shooting channel 18 for guiding the actual airbag 7 in deployment of the passenger airbag 4 is attached to this pin.

According to FIG. 2, a sheet metal part 19 which has thin walls and which is connected locally by multiple rivets 20 to the adjacent carrier part 13 is provided on the inside of the airbag cover 11. A front edge area 21 of the sheet metal part 19, which is bent downward obliquely at an angle, is connected to a wall section 22 of the shooting channel 18 which is directed in the same direction by screws, rivets or the like. The midpoint 23 of a radius-like transition area between the front edge area 21 and the adjacent partial area of the sheet metal part 19 running approximately parallel to the airbag cover 11 forms the transverse pivot axis 12 of the airbag cover 11.

Figure 4:
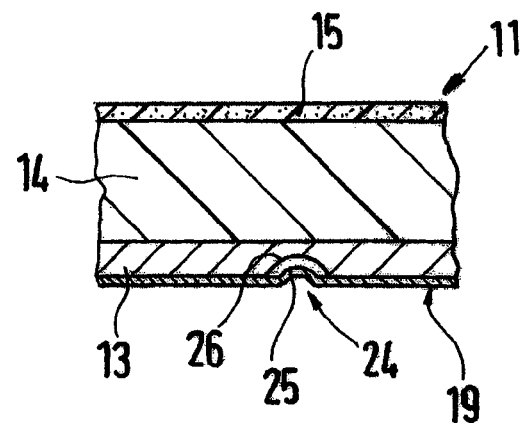
FIG. 4 is an enlarged cross-sectional detail view of FIG. 2 in an enlarged diagram.

In order for the airbag cover 11 not to damage the windshield 2 in deploying the airbag, at least one intended breaking line 24 is provided running transversely on the airbag cover 11—as seen in the direction of travel of the vehicle—at a distance from the pivot axis 12 so that the airbag cover 11 folds upward into a bent position B on coming in contact with the windshield 2 see (FIG. 3). The intended breaking line 24 is formed by a crease 25, which is directed outward and/or upward in the sheet metal part 19, and a corresponding weakened area 26 in the adjacent carrier part 13 is placed in front. The crease 25 and the weakened area 26 have a semicircular, V-shaped, U-shaped or similar cross section. The weakened area 26 on the carrying part 13 runs at a slight distance from the crease 25 in the sheet metal part 19 in front of it as seen in FIG. 4.

Figure 5:
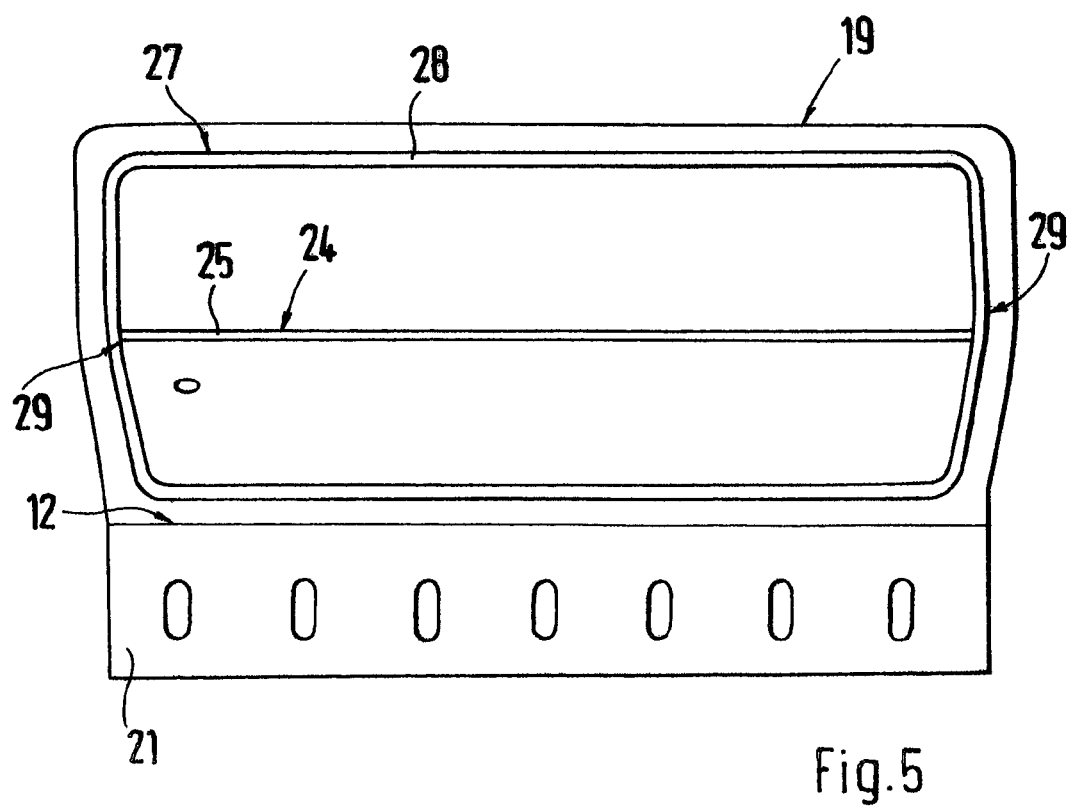
FIG. 5 is a view from the inside of the interior sheet metal part of the airbag cover.

The thin sheet metal part 19 extends over almost the entire area of the pivotable airbag cover 11. A peripheral frame-shaped reinforcing crease 28, which is directed inwardly, is provided on an outer edge 27 of the sheet metal part 19. The transverse crease 25, which faces outward, extends over an essential part of the width of the airbag cover 11 and protrudes laterally approximately to the two lateral sections 29 of the frame-like reinforcing crease 28 as shown in FIG. 5. The intended breaking line 24 is provided approximately in a central area of the longitudinal extent of the airbag cover 11 and is a distance C away from the pivot axis 12 as seen in FIG. 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Instrument panel accommodating a front passenger airbag, comprising an airbag covering extending on a top side of and being integrated with the instrument panel adjacent to a windshield, the instrument panel being displaceable in an upward direction toward the windshield about a transversely extending swiveling axis to open up a passage opening for a gas bag of the front passenger airbag, a transversely extending desired buckling point is spaced from the swiveling axis on the airbag covering constructed integrally with the instrument panel such that the airbag covering is able to fold upwards about the buckling point when resting against the windshield, the airbag covering being connected on an interior side thereof with a thin-walled sheet metal part, a bent forward edge area of the sheet metal part being operatively fastenable to an adjoining shooting channel of the front passenger airbag, and the desired buckling point being constituted by an outwardly-directed or upwardly-directed bead of the sheet metal part and a corresponding weakening of the adjoining rigid carrier part of the instrument panel or of the airbag covering.

2. Instrument panel according to claim 1, wherein the instrument panel and the airbag covering are comprised of the rigid carrier part, a plastic foam layer disposed above the rigid carrier part and a decorative layer provided on a side of the front passenger space.

3. Instrument panel according to claim 1, wherein a radius-shaped transition area of the sheet metal part forms the transversely extending swiveling axis for the airbag covering.

4. Instrument panel according claim 1, wherein the sheet metal part extends over substantially an entire surface area of the airbag covering.

5. Instrument panel according to claim 1, wherein an edge side of the sheet metal part has a surrounding, frame-shaped, inward-directed stiffening crease.

6. Instrument panel according to claim 5, wherein the transversely extending buckling point projects approximately to both lateral edges of the surrounding stiffening bead.

7. Instrument panel according to claim 1, wherein rivets locally connect the sheet metal part with the rigid carrier part.

* * * * *